(12) United States Patent
Park et al.

(10) Patent No.: US 7,532,577 B2
(45) Date of Patent: May 12, 2009

(54) MANAGING TRANSMISSION CONTROL PROTOCOL (TCP) CONNECTIONS

(75) Inventors: Hyoung-Joon Park, Seongnam-si (KR); Byung-Gu Choe, Seoul (KR); Yong-Seok Park, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 616 days.

(21) Appl. No.: 11/052,095

(22) Filed: Feb. 8, 2005

(65) Prior Publication Data

US 2005/0180419 A1 Aug. 18, 2005

(30) Foreign Application Priority Data

Feb. 13, 2004 (KR) .................. 10-2004-0009774

(51) Int. Cl.
*G01R 31/08* (2006.01)
*G06F 11/00* (2006.01)
*G06F 15/173* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. ...................... 370/241; 709/223
(58) Field of Classification Search .................. 370/229, 370/231, 232, 233, 241, 252, 254, 389; 709/220, 709/223, 224, 227, 228, 230; 719/313
See application file for complete search history.

(56) References Cited

U.S. PATENT DOCUMENTS

| 5,978,849 A | 11/1999 | Khanna |
| 6,212,175 B1 * | 4/2001 | Harsch ....................... 370/338 |
| 6,330,226 B1 | 12/2001 | Chapman et al. |
| 6,484,174 B1 * | 11/2002 | Wall et al. ....................... 707/9 |
| 6,721,907 B2 * | 4/2004 | Earl ............................. 714/57 |

(Continued)

FOREIGN PATENT DOCUMENTS

JP 05-204807 8/1993

(Continued)

OTHER PUBLICATIONS

Douglas E. Comer, John C. Lin, "Probing TCP Implementations," Proceedings of the USENIX Summer 1994 Technical Conference, USENIX Association, 1994, vol. 1, pp. 245-255.

(Continued)

*Primary Examiner*—Edan Orgad
*Assistant Examiner*—Hoang-Chuong Q Vu
(74) *Attorney, Agent, or Firm*—Robert E. Bushnell, Esq.

(57) ABSTRACT

Managing a Transmission Control Protocol (TCP) connection established between two applications includes providing a TCP/IP (Internet Protocol) kernel adapted to: store establishment information of the TCP connection and an established value for a TCP session connectivity check with respect to the TCP connection; create a Session Connectivity Check (SCC) message according to the establishment information and established value; transmit the SCC message to a TCP/IP kernel of another party, and determine whether or not the TCP connection is operating normally according to whether an SCC response message has been received from the TCP/IP kernel of the another party.

13 Claims, 11 Drawing Sheets

U.S. PATENT DOCUMENTS

| | | |
|---|---|---|
| 6,757,255 B1 | 6/2004 | Aoki et al. |
| 6,839,344 B1 * | 1/2005 | Couillaud et al. ............ 370/353 |
| 6,981,180 B1 * | 12/2005 | Bailey et al. .................. 714/38 |
| 7,002,988 B1 * | 2/2006 | Benedyk et al. ............. 370/467 |
| 7,088,698 B1 * | 8/2006 | Harsch ........................ 370/338 |
| 7,152,185 B2 * | 12/2006 | Srivastava et al. ............. 714/24 |
| 7,155,512 B2 * | 12/2006 | Lean et al. .................. 709/224 |
| 7,213,063 B2 * | 5/2007 | Bressoud et al. ............ 709/223 |
| 7,225,249 B1 * | 5/2007 | Barry et al. ................. 709/227 |
| 7,275,106 B1 * | 9/2007 | Bean et al. .................. 709/227 |
| 2001/0003164 A1 * | 6/2001 | Murakami .................... 700/22 |
| 2001/0017844 A1 | 8/2001 | Mangin |
| 2002/0071436 A1 * | 6/2002 | Border et al. .......... 370/395.32 |
| 2002/0078135 A1 * | 6/2002 | Venkatsubra ................. 709/202 |
| 2003/0023767 A1 * | 1/2003 | Brabson et al. ............. 709/313 |
| 2003/0105850 A1 | 6/2003 | Lean et al. |
| 2003/0212801 A1 | 11/2003 | Yang-Huffman |
| 2004/0059827 A1 * | 3/2004 | Chiang et al. ............... 709/235 |
| 2004/0153669 A1 * | 8/2004 | Yang et al. .................. 713/201 |
| 2005/0086342 A1 * | 4/2005 | Burt et al. ................... 709/224 |
| 2005/0105508 A1 * | 5/2005 | Saha ........................... 370/352 |

FOREIGN PATENT DOCUMENTS

| | | |
|---|---|---|
| JP | 11-032084 | 2/1999 |
| JP | 2001-345829 | 12/2001 |

OTHER PUBLICATIONS

Okabe Yasusi, 1. First network protocol and Internet, 3. Detailed explanation on communication model of network and network technology lecture TCP/IP protocol, Japan, ITmedia Inc., May 22, 2000, URL, http://www.atmarkit.co.jp/fwin2k/network/tcpip001/tcpip04.html.

Program product HI-UX/E Network system expansion package (NSEXT), Third edition, Hitachi,Ltd., Jul. 31, 1992, Third edition, p. 166 to 173.

Office Action corresponding to Chinese Patent Application No. 200510007892.9, issued on Aug. 29, 2008.

Office Action corresponding to Korean Patent Application No. 10-2004-0009774, issued on Dec. 8, 2005.

Office Action corresponding to Japanese Patent Application No. 2005-029537, issued on May 7, 2008.

* cited by examiner

FIG. 3

| Kind | Length | Meaning | Reference |
|---|---|---|---|
| 0 | – | End of Option List | [RFC793] |
| 1 | – | No-Operation | [RFC793] |
| 2 | 4 | Maximum Segment Size | [RFC793] |
| 3 | 3 | WSOPT-Window Scale | [RFC1323] |
| 4 | 2 | SACK Permitted | [RFC2018] |
| 5 | N | SACK | [RFC2018] |
| 6 | 6 | Echo(obsoleted by option 8) | [RFC1072] |
| 7 | 6 | Echo Reply(obsoleted by option 8) | [RFC1072] |
| 8 | 10 | TSOPT-Time Stamp Option | [RFC1323] |
| 9 | 2 | Partial Order Connection Permitted | [RFC1693] |
| 10 | 3 | Partial Order Service Profile | [RFC1693] |
| 11 | | CC | [RFC1644] |
| 12 | | CC.NEW | [RFC1644] |
| 13 | | CC.ECHO | [RFC1644] |
| 14 | 3 | TCP Alternate Checksum Request | [RFC1146] |
| 15 | N | TCP Alternate Checksum Data | [RFC1146] |
| 16 | | Skeeter | [Subbu & Monroe] |
| 17 | | Bubba | [RFC2385] |
| 18 | 3 | Trailer Checksum Option | [Scott] |
| 19 | 18 | MD5 Signature Option | [Scott] |
| 20 | | SCPS Capabilities | [Scott] |
| 21 | | Selective Negative Acknowledgements | [Scott] |
| 22 | | Record Boundaries | [Knowles] |
| 23 | | Corruption experienced | [Knowles] |
| 24 | | SNAP | [Sukonnik] |
| 25 | | Unassigned(released 12/18/00) | |
| 26 | | TCP Compression Fiter | [Bellovin] |

FIG. 7

| Option name | get | set | Description |
|---|---|---|---|
| SO_BROADCAST | O | O | permit sending of broadcast msgs |
| SO_DEBUG | O | O | turn on debugging info recording |
| SO_DONTROUTE | O | O | just use interface address |
| SO_ERROR | O | | get error status and clear |
| SO_KEEPALIVE | O | O | keep connections alive |
| SO_LINGER | O | O | linger on close if data present |
| SO_OOBINLINE | O | O | leave received OOB data in-line |
| SO_RCVBUF | O | O | receive buffer size |
| SO_SNDBUF | O | O | send buffer size |
| SO_RCVLOWAT | O | O | receive low-water mark |
| SO_SNDLOWAT | O | O | send low-water mark |
| SO_RCVTIMEO | O | O | receive timeout |
| SO_SNDTIMEO | O | O | send timeout |
| SO_REUSEADDR | O | O | allow local address reuse |
| SO_TYPE | O | | get socket type |
| SO_USELOOPBACK | O | O | bypass hardware when possible |

FIG. 8

| SO_SCC | O | O | Session Connectivity Check |

MANAGING TRANSMISSION CONTROL PROTOCOL (TCP) CONNECTIONS

CLAIM OF PRIORITY

This application makes reference to, incorporates the same herein, and claims all benefits accruing under 35 U.S.C. § 119 from an application for APPARATUS AND METHOD FOR MANAGING TCP CONNECTION earlier filed in the Korean Intellectual Property Office on 13 Feb. 2004 and there duly assigned Ser. No. 2004-9774.

BACKGROUND OF THE INVENTION

1. Field of the Invention

The present invention relates to managing Transmission Control Protocol (TCP) connections in an embedded system, and more particularly, to managing TCP connections in an embedded system, where TCP connections established between software blocks executed in the embedded system are monitored and managed.

2. Description of the Related Art

An embedded system is a system where a unit group includes a plurality of processors according to a specific need, and each of the processors provides services aimed at the corresponding group by cooperating functions with one another. That is, the embedded system needs connections between software (S/W) blocks operating in each of the processors for the cooperation to achieve the object. Also, a disconnection or abnormal operation between specific S/W blocks can have an effect on the functions of other S/W blocks in the embedded system. Thus, there is a need for detecting whether there is an abnormal operation of a connection and for closing the abnormal connection.

In a network system, a plurality of S/W blocks are interlocked and operate with one another, and a plurality of methods such as a shared memory, a Message Queue, a TCP/UDP (User Datagram Protocol)/IP (Internet Protocol) are used in order to communicate between the S/W blocks. The shared memory or the Message Queue are used to effect communication between the S/W blocks operating in the same hardware (H/W) block, and the TCP/UDP/IP is used to effect communication between S/W blocks operating in separate H/W blocks. In particular, the TCP/IP is frequently used to effect communication between H/W blocks in an embedded system comprising a plurality of H/W blocks such as a large-scale network system. This is due to the TCP more reliably confirming whether packets were transmitted and re-transmitting the packets that were not transmitted as compared to the UDP. The high reliability communication services provided by the TCP forwards data transmitted from a higher layer of the transmission side to a higher layer of the reception side in perfect form.

The TCP/IP was devised to support reliable communication in a network. However, the TCP/IP is not a polling protocol. A polling protocol has a transmission control scheme to sequentially query whether there is a transmission request, to generate an instruction to start the transmission to the terminal when there is a request, and to query whether there is a transmission request for the next terminal when there is no request. Accordingly, the TCP does not provide a mechanism to frequently check the state of a connection.

Although a keep-alive timer checks a connection in the TCP, it is not used to determine a state of a peer connection but rather is used to determine a bad peer. The keep-alive timer is used to prevent two TCP from being in an idle state for a long time interval. Assume that a client establishes a TCP connection with a server, transmits data to the server, and does not transmit any more data. The client requested the establishment of the TCP connection, and the server received a request for the establishment of the TCP connection from the client.

When there is an error in the client, the TCP connection between the erroneous client and the server will be maintained forever. In order to obviate such a situation, the keep-alive timer is embodied in most of the servers. Whenever the server receives a segment from the client, the server initializes the timer. The time-termination interval is generally chosen to be two hours. When the server does not receive any segment from the client within the two hour interval, the server transmits a prove to determine whether there is an error. When the server does not receive any response even after it has transmitted 10 prove segments every 75 seconds, the server considers the client to be down and terminates the corresponding TCP connection. Accordingly, when the TCP connection is checked using the keep-alive timer, the system cannot detect an error and close the corresponding TCP connection for a long time after an error occurs in the TCP connection.

Most systems use a method of transmitting and receiving a small message periodically in an application layer as another method of monitoring the TCP connection. The system using this method determines that an error has occurred in this TCP connection when there is no message exchange in a specific TCP connection for a predetermined time interval. This method is more effective than using the keep-alive timer in that the TCP connection error can be rapidly detected.

However, when the method of monitoring the TCP connection in each of the application layers is applied in the embedded system in which many application processes are operating, a large amount of overhead occurs since such a method is embodied in every application that is needed to maintain the connection for the corresponding function and to rapidly detect the connection closing.

In particular, when an event occurs that is applied to all applications in the same manner, for example, turning off of a subsystem, removing a link, removal of an H/W block, the connection between S/W blocks is actually in a state where no data is being transceived, and an effective embedded system can be embodied only by detecting and closing the connection in such a state and performing necessary functions in each of the S/W blocks.

An embedded system can consist of a plurality of H/W blocks. Each H/W block can perform a TCP/IP communication with another H/W block through a TCP/IP kernel. A plurality of S/W blocks are executed in each H/W block, and the S/W blocks are connected to S/W blocks that are executed in another H/W block through the TCP/IP communication. Then, in that case, in order to monitor the TCP connection between the S/W blocks, the message must be exchanged between all of the S/W blocks.

For example, a transmission path of a monitoring message used to monitor the TCP connection between an S/W block of a first H/W block and an S/W block of a second H/W block, is the S/W block of the first H/W block to a TCP/IP kernel of the first H/W block to a TCP/IP kernel of the second H/W block to an S/W block of the second H/W block. Also, a response message is transmitted from the S/W block of the second H/W block to the S/W block of the first H/W block through a reverse path.

In order to monitor the TCP connection using such a method, too much overhead is created since the message must be frequently transmitted through the path described above. Accordingly, there is a need to manage the TCP connection, where there is little overhead and the monitoring is rapidly performed in order to effectively manage an embedded system.

SUMMARY OF THE INVENTION

It is an object of the present invention to manage a TCP connection of an embedded system, where the closing of the TCP connection is rapidly detected.

It is another object of the present invention to manage a TCP connection, where an overhead created according to a TCP connection monitoring function is reduced.

It is yet another object of the present invention to manage a TCP connection, where a function of monitoring a more standardized TCP connection can be effected.

In order to achieve the above objects, the present invention performs a connection state monitoring function of a TCP connection in a TCP/IP kernel.

As an embodiment of the present invention, the present invention provides an apparatus and method to manage a TCP connection wherein monitoring for the TCP connection, that is, the TCP session connectivity check is performed in the TCP/IP kernel existing under the application S/W blocks in order to rapidly detect a TCP connection operating abnormally by periodically monitoring the state of the TCP connection established between S/W blocks that are being executed in an embedded system of the present invention, and to reduce overhead accordingly.

As another embodiment of the present invention, the present invention provides an apparatus to manage a Transmission Control Protocol (TCP) connection established between two applications, comprising: a TCP/IP kernel for storing establishment information of the TCP connection and a established value for a TCP session connectivity check with respect to the TCP connection, creating an Session Connectivity Check (SCC) message according to the establishment information and established value, transmitting the message to the TCP/IP kernel of the other party, and determining whether or not the TCP connection is operating normally according to whether an SCC response message has been received from a TCP/IP kernel of the other party.

As yet another embodiment of the present invention, the present invention provides a method to manage a TCP connection established between two applications, the method comprising: determining whether the TCP connection requests a TCP session connectivity check; creating an SCC message for the TCP session connectivity check; transmitting the created SCC message to a TCP/IP kernel of the other party connected through TCP connection; and determining whether a response message for the SCC message has been received from the TCP/IP kernel of the other party within a predetermined time interval, and then determining that the TCP connection is not operating normally when the response message is not received within the predetermined time interval.

As still another embodiment of the present invention, the present invention provides a program storage device, readable by a machine, tangibly embodying a program of instructions executable by the machine to perform a method of managing a Transmission Control Protocol (TCP) connection established between two applications, the method comprising: determining whether the TCP connection requests a TCP session connectivity check; creating a Session Connectivity Check (SCC) message for the TCP session connectivity check; transmitting the created SCC message to a TCP/IP kernel of another part connected via the TCP connection; and determining whether a response message for the SCC message has been received from the TCP/IP kernel of the another party within a predetermined time interval, and then determining that the TCP connection is not operating normally when the response message is not received within the predetermined time interval.

As still another embodiment of the present invention, the present invention provides a program storage device, readable by a machine, tangibly embodying a program of instructions executable by the machine to perform a method of managing a Transmission Control Protocol (TCP) connection established between two applications, the method comprising: determining whether the TCP connection requests a TCP session connectivity check; determining whether traffic exists on a TCP connection line; creating a Session Connectivity Check (SCC) message for the TCP session connectivity check and transmitting the message to a TCP/IP kernel of another party connected via the TCP connection when traffic does not exist on the TCP connection line; and determining whether a response message for the SCC message has been received from the TCP/IP kernel of the another party within a predetermined time interval, and then determining that the TCP connection is not operating normally when the response message is not received within the predetermined time interval.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings, in which like reference symbols indicate the same or similar components, wherein:

FIG. 3 is a list of the TCP options used in an option field of a TCP header;

FIG. 7 is a view of a socket option provided by a BSD system;

FIG. 8 is a view of an SO_SCC being a new TCP option in accordance with an embodiment of the present invention;

DETAILED DESCRIPTION OF THE INVENTION

Figure 1:
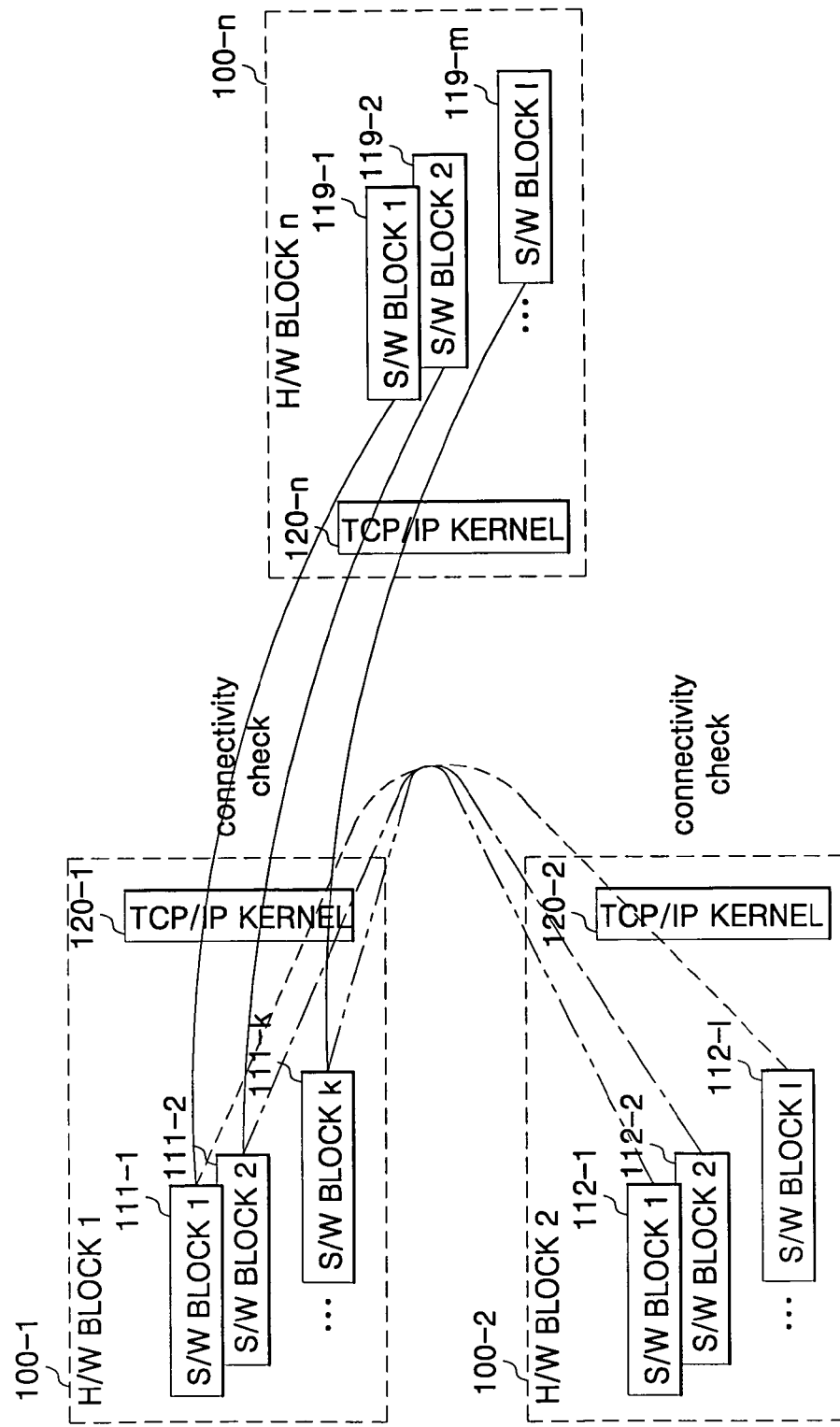
FIG. 1 is a view of a TCP session connectivity check via a message exchange between S/W blocks of an embedded system.

FIG. 1 is a view of monitoring a TCP connection via a message exchange between S/W blocks of an embedded system.

The system shown in FIG. 1 is an embedded system consisting of a plurality of H/W blocks 100-1 to 100-n. Each H/W block 100 can perform a TCP/IP communication with another H/W block 100 through a TCP/IP kernel. A plurality of S/W blocks 111 to 119 are executed in each H/W block 100, and the S/W blocks 111 to 119 are connected to S/W blocks 111 to 119 that are executed in another H/W block 100 via the TCP/IP communication. Then, in that case, in order to monitor the TCP connection between the S/W blocks 111 to 119, a message must be exchanged between all of the S/W blocks 111 to 119.

For example, a transmission path of a monitoring message used to monitor the TCP connection between an S/W block 1(111-1) of an H/W block 1 and an S/W block 1(112-1) of an H/W block 2, is the S/W block 1 (111-1) of the H/W block 1 to a TCP/IP kernel 120-1 of the H/W block 1 to a TCP/IP kernel 120-2 of the H/W block 2 to a S/W block 1 (112-2) of the H/W block 2. Also, a response message is transmitted from the S/W block 1 (112-1) of the H/W block 2 to the S/W block 1 (111-1) of the H/W block 1 through a reverse path.

The present invention is described more fully below with reference to the accompanying drawings, in which exemplary embodiments of the present invention are shown. Reference numerals are used in the accompanying drawings for the convenience of description. When a plurality of blocks having the same functions are drawn, a "-" is used to distinguish the blocks. For example, the H/W blocks of FIG. 1 have reference numerals 100-1, 100-2, etc. When each of the H/W blocks is referred to specifically, the reference numerals are added, for example, 100-1 and 100-2. When the H/W blocks are collectively referred to, reference numeral 100 is used.

The present invention is described below with an embedded system as its subject, and a system to which the present invention is effectively applied is the embedded system, too. However, the present invention can be applied to systems other than embedded systems that need monitoring of a TCP connection.

A TCP/IP kernel 120 shown in FIG. 1 corresponds to a TCP kernel layer that manages a file, a processor and a network, which manages each of S/W blocks 111 to 119 that are being executed. The TCP/IP kernel 120 must have information regarding the TCP connection established between the S/W blocks 111 to 119. Therefore, the TCP/IP kernel 120 monitors the TCP connection established between the S/W blocks 111 to 119 with reference to such information. When the TCP/IP kernel 120 monitors the TCP connection established between the S/W blocks 111 to 119, since a monitoring message is exchanged only between the TCP/IP kernels 120, the TCP connection monitoring overhead is considerably reduced.

Figure 2:
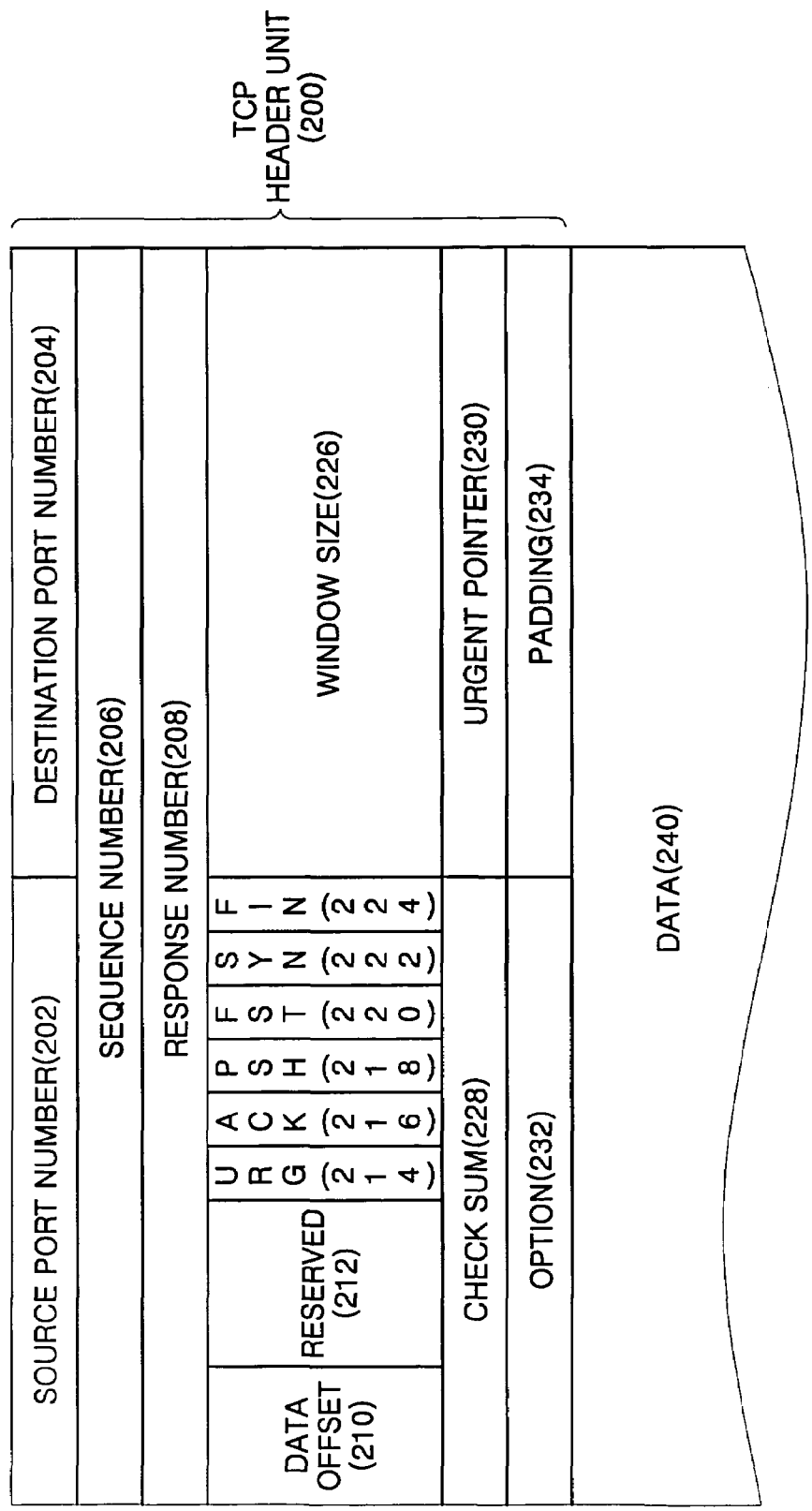
FIG. 2 is a view of a format of a TCP packet used in a TCP connection.

FIG. 2 is a view of a format of a TCP packet used in a TCP connection. Referring to FIG. 2, the TCP packet is composed of a header unit 200 and a data unit 240. The TCP header unit 200 includes a source port field 202 of 16 bits, a destination port field 204 of 16 bits, a sequence number field 206 of 32 bits, an acknowledgment number field 208 of 32 bits, a data offset field 210 of 4 bits, a reserved field 212 of 6 bits, control flag fields 214 to 224 of 6 bits, a window size field 226 of 16 bits, a checksum field 228 of 16 bits, an urgent pointer field 230 of 16 bits, an options field 232 of 24 bits, and a padding field 234 of 8 bits.

The header unit 200 of the TCP packet includes information used to identify the connection that a packet belongs to. The source port number 202 and the destination port number 204 of the TCP header unit 200 are identifiers provided by the TCP. The port numbers are identifiers of 0 to 65535. The sequence number 206 indicates a transmission order of the TCP packet. That is, when data is divided and transmitted on the TCP packet, the sequence number 206 is used to restore the divided data to the original order. The acknowledgment number 208 informs the transmission side that the reception side has correctly received the TCP packet. The data offset 210 indicates a length of the TCP header. Generally, a length of the TCP header that does not include a special option is 20 bytes. The reserved field 212 is a field reserved for later expansion and has a length of 6 bytes.

The control flags 214 to 224 generally have meanings when their values are designated as '1', and their meanings are as follows. The URG (Urgent Flag) 214 indicates that the packet includes data to be processed urgently. A location of the data to be processed urgently is contained in the urgent pointer 230. The ACK (Acknowledgment Flag) 216 indicates whether or not the acknowledgment is used. When a value of the ACK 216 is established so as not to use the acknowledgment, it gives up reliable communication that is a characteristic of the TCP and operates in a form similar to the UDP communication. The PSH (Push Flag) 218 indicates to which application of the upper layers the data received by the TCP is to be transmitted. The RST (Reset Flag) 220 generates a reset instruction when poor communication occurs and it is not possible to control the communication. The SYN (Synchronize Flag) 222 establishes a virtual line. The FIN (Fin Flag) 224 indicates that the transmission side has finished transmitting the data.

The window size 226 indicates the amount of communicable data. The urgent pointer 230 is available when the URG 214 is established. The numeral shown in the window size 226 is treated as a pointer to indicate data that is to be processed urgently. The option 232 optionally coordinates detailed matters of the communication. A user selects whether or not the option is established. The checksum 228 is a method of detecting a data error, which is used to check the completeness of the packet.

FIG. 3 is a list of the TCP options used in an option field of the TCP header shown in FIG. 2.

Figure 4:
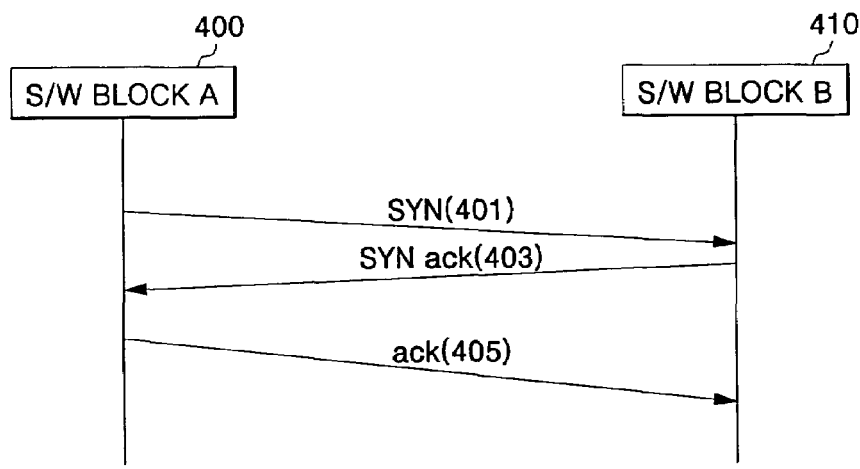
FIG. 4 is a view of a process for creating a TCP connection between S/W blocks shown in FIG. 1.

FIG. 4 is a view of a process for creating a TCP connection between the S/W blocks shown in FIG. 1.

An S/W block A 400 and an S/W block B 410 of FIG. 4 correspond to the S/W blocks 111 to 119 of FIG. 1. At first, the S/W block A 400 transmits to the S/W block B 410 an SYN packet 401 whose SYN flag 222 is 1 and whose ACK flag 216 is 0. The S/W block B 410 that received the TCP packet 401 from the S/W block A 400 transmits to the S/W block A 400 a response to the TCP packet 401, that is, an SYN acknowledgment packet 403 whose SYN flag 222 and ACK flag 216 are both 1. The S/W block A 400 that received the SYN acknowledgment packet 403 transmits to the S/W block B 410 an ACK packet 405 whose ACK flag 216 is 1 and whose SYN flag 222 is 0, so that a TCP connection is established between the S/W block A 400 and the S/W block B 410. Such a connection creation process is referred to as 3-way handshake.

A TCP connection loss check function for the TCP connection created through the process of FIG. 4 is embodied using an option function of the TCP. In order to perform the TCP session connectivity check in accordance with the present invention, negotiation is performed to use a TCP connection loss check function using an SYN message to which a new TCP option is added in the TCP connection creation process of FIG. 4. As such, a determination is made as to whether or not the TCP session connectivity check for an arbitrary TCP connection has been performed when the TCP connection was created. A determination is made as to whether or not the TCP session connectivity check for the created TCP connection has been performed according to requests of S/W blocks 111 to 119 that requested creation of the TCP connection.

Figure 5:
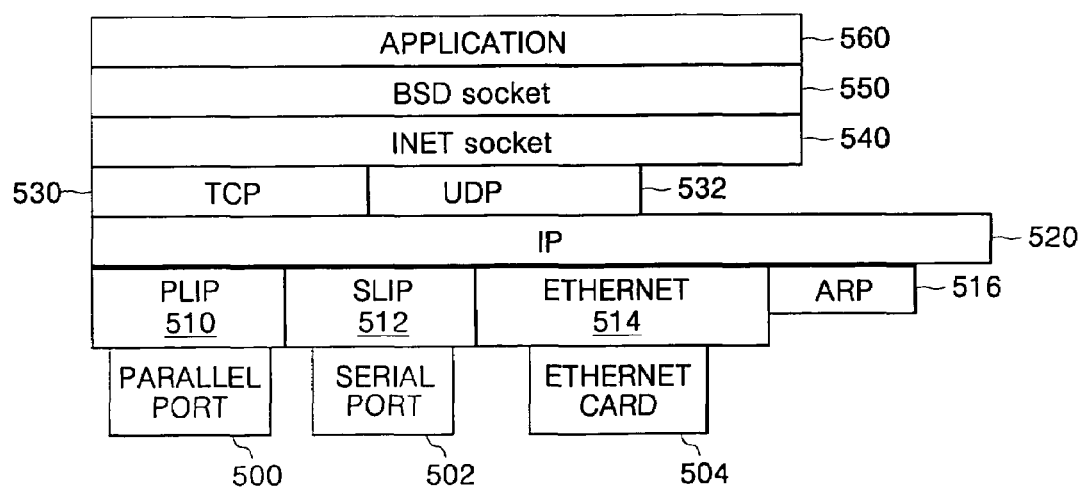
FIG. 5 is a view of a layer structure of a socket and a protocol stack.

FIG. 5 is a view of a layer structure of a socket and a protocol stack. Referring to FIG. 5, a parallel port 500, a serial port 502, and an Ethernet card 504 that are network interfaces are positioned on the lowest layer. The network interface is hardware corresponding to a specific network.

Device drivers of a Parallel Line Internet Protocol (PLIP) 510, a Serial Line Internet Protocol (SLIP), an Ethernet 514, and an Address Resolution Protocol (ARP) 516 are positioned on the network interface. The device driver is software communicating with hardware.

An Internet Protocol (IP) 520 is positioned at a network layer that is a layer higher than the device driver. TCP 530 and User Datagram Protocol (UDP) 532 are positioned at a transport layer that is a layer higher than the network layer.

An INET socket 540 is positioned on the transport layer. A Berkeley Software Distribution (BSD) socket 550 is positioned on the INET socket 540. The INET socket 540 and BSD socket 550 are generally referred to as a socket. The socket is an Interprocess Communication (IPC) interface based on the TCP/IP. Using the socket, it is possible to transceive data through a network in the same manner that it is possible to read and write a file. The INET socket 540 is a socket for the TCP and UDP, and the BSD socket 550 manages a general socket interface. Finally, the highest layer is an application 560.

In FIG. 5, the network interfaces all the elements except the application 560, that is, the BSD socket 550, the parallel port 500, the serial port 502 and the Ethernet card 504 can correspond to an operating system. Among the operating systems, the TCP 530 of the transport layer and the IP 520 of the network layer particularly correspond to kernels. Of course, such a division will be a division with respect to the communication of the system.

The S/W blocks 111 to 119 correspond to the application 560 shown in FIG. 5. That is, the S/W blocks 111 to 119 are positioned at the highest layer of the layer structure used to perform such communication as message transmission.

Figure 6:
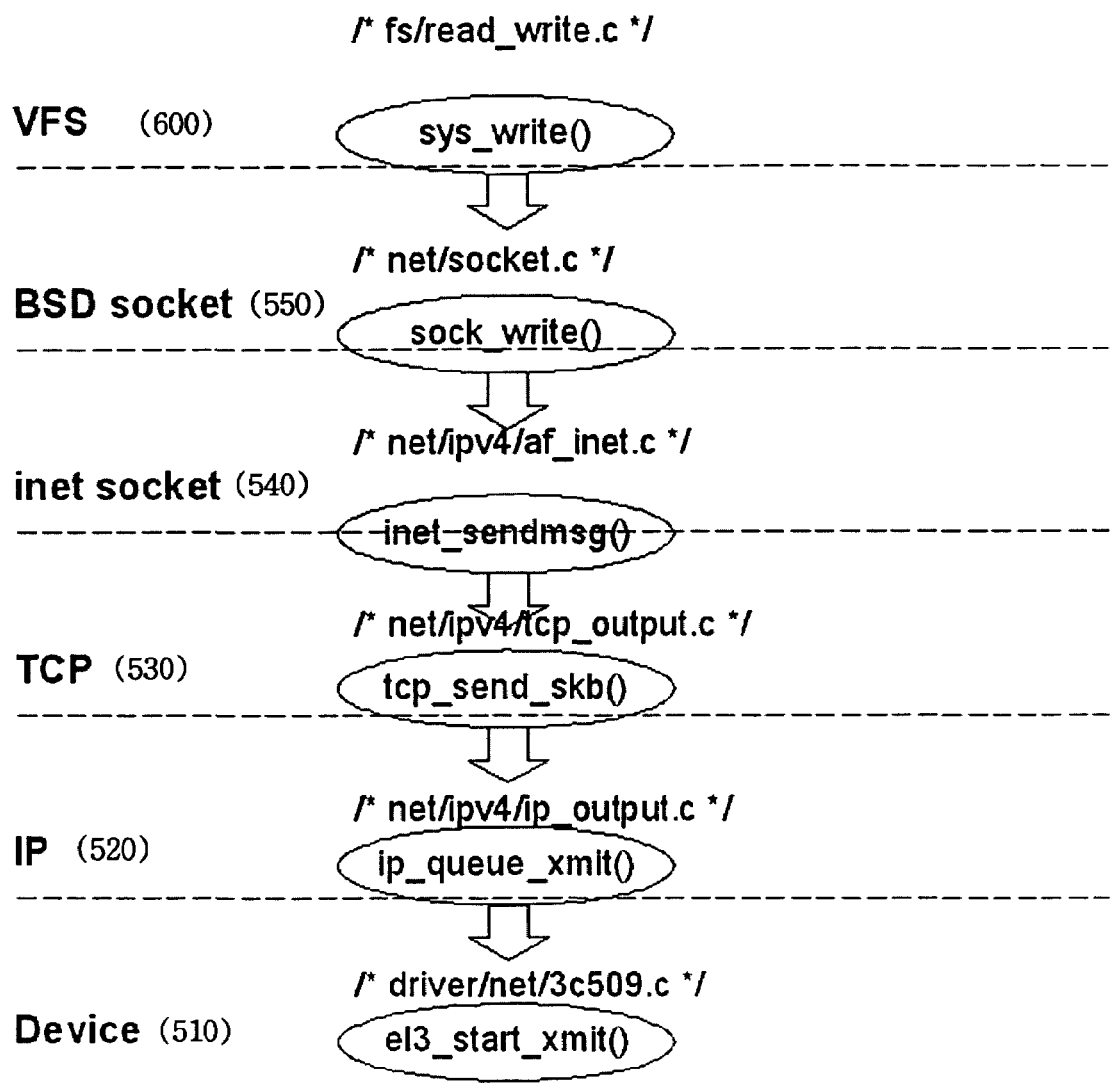
FIG. 6 is a view of control flow on a system when a Linux kernel is used.

FIG. 6 is a view of control flow on a system when a Linux kernel is used, for example.

When an arbitrary application that is, an arbitrary S/W block 111 to 119 wants to transmit a message to another S/W block 111 to 119, the control flow shown in FIG. 6 is performed on the system. A S/W block 111 to 119 that wishes to transmit the message calls a function referred to as sys_write( ) from a Visual File System (VFS) 600 that is one of the interfaces and records message contents to be transmitted. The message that the S/W block wants to transmit as described above is transmitted to the BSD socket 550.

The BSD socket 550 that received the message from the VFS 600 calls a function of sock_write( ) and transmits the message to the INET socket 540. The INET socket 540 calls a function of inet_sendmsg( ) and transmits a message received from the BSD socket 550 to the TCP 530. The TCP 530 calls a function of tcp_send_skb( ) and transmits a message received from the INET 540 socket to the IP 520. The IP 520 calls a function of ip_queue_xmit( ) and transmits a message received from the TCP 530 to a device 610. The device 610 calls a function of el3_start_xmit( ) and transmits a message received from the TCP 530.

Since the TCP/IP of a kernel performs the TCP connectivity check in accordance with the present invention, when the TCP connectivity check in accordance with the present invention is applied, only function calls below the TCP 530 of FIG. 6 are performed. Accordingly, function calls above the INET socket 540 and its message flow can be omitted, and accordingly the overhead is reduced.

FIG. 7 is a view of a socket option provided by a BSD system, and FIG. 8 is a view of an SO_SCC being a new TCP option in accordance with an embodiment of the present invention.

The TCP session connectivity check in accordance with the present invention can be effected by adding the SO_SCC (Socket Option_Session Connecitivity Check) as the new TCP option, as shown in FIG. 8. The TCP connectivity check for the corresponding TCP is established and performed using the SO_SCC when the TCP connection is created for the first time.

By conducting the TCP session connectivity check function in accordance with an embodiment of the present invention, the TCP/IP kernel 120 performs a monitoring function for the TCP connection established between the S/W blocks.

Figure 9:
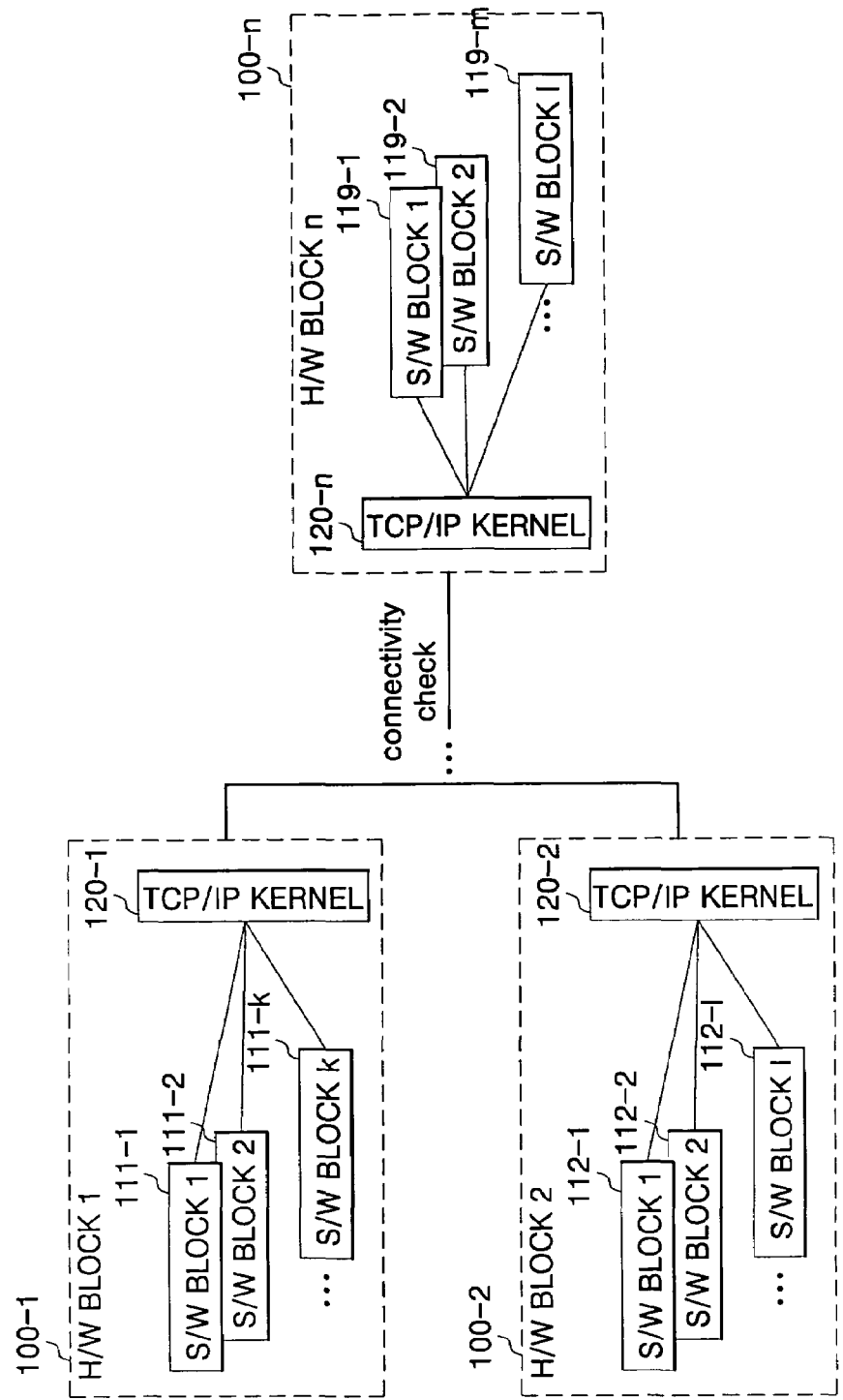
FIG. 9 is a view of a TCP session connectivity check performed in a TCP/IP kernel in accordance with an embodiment of the present invention.

FIG. 9 is a view of a TCP session connectivity check performed in the TCP/IP kernel 120 in accordance with an embodiment of the present invention.

When the TCP session connectivity check is performed in the TCP/IP kernel 120 in accordance with an embodiment of the present invention, as shown in FIG. 9, a message exchange for the TCP session connectivity check is performed only between the TCP/IP kernels 120. For example, a message exchange for a connectivity check for the TCP connection established between the S/W block 1 (111-1) of the H/W block 1 and the S/W block 1 (112-1) of the H/W block 2 is performed only between the TCP/IP kernel 120-1 of the H/W block 1 and the TCP/IP kernel 120-2 of the H/W block 2. That is, since a message exchange between each of the S/W blocks 111 to 119 and the TCP/IP kernel 120 is omitted, the overhead is reduced, accordingly. Meanwhile, in order to perform the TCP session connectivity check in the TCP/IP kernel 120 through a message exchange between the TCP/IP kernels 120, its establishment has to be performed when the TCP connection is created. That was mentioned when the creation process of TCP connection shown in FIG. 4 was explained.

A structure of the TCP/IP kernel 120 in accordance with an embodiment of the present invention is described below with reference to the drawings.

Figure 10:
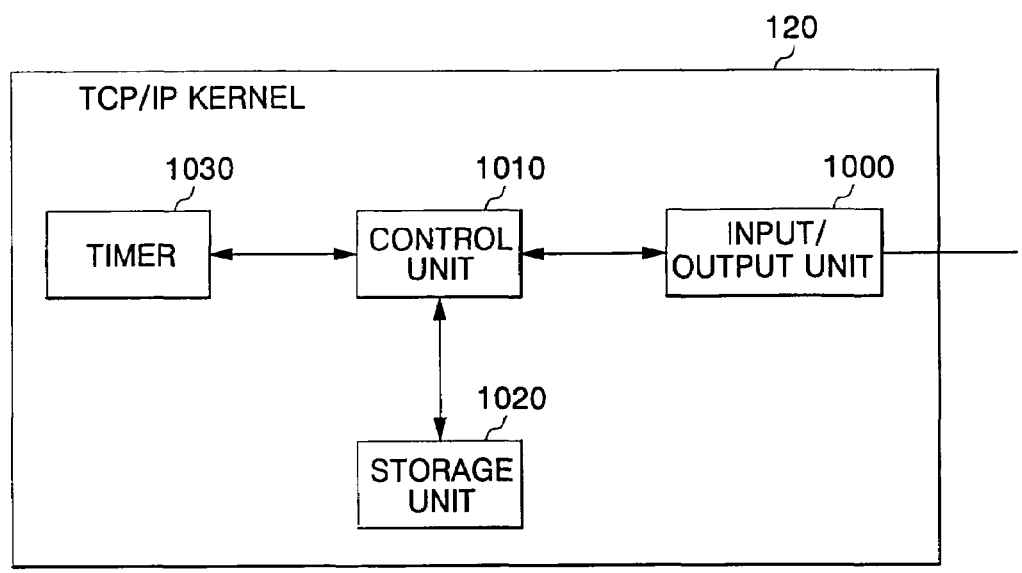
FIG. 10 is view of the elements of the TCP/IP kernel to perform a TCP/IP session connectivity check in the TCP/IP kernel of FIG. 9.

FIG. 10 is view of constitutional elements of a TCP/IP kernel 120 to perform a TCP/IP session connectivity check in the TCP/IP kernel 120 shown in FIG. 9.

As shown in FIG. 10, the TCP/IP kernel 120 in accordance with the present invention includes an input/output unit 1000, a control unit 1010, a storage unit 1020, and a timer 1030. Preferably, the timer 1030 of FIG. 10 can be an SCC timer.

The input/output unit 1000 of the TCP/IP kernel 120 provides an interface between a higher layer and a lower layer. Using that, the TCP/IP kernel 120 provides TCP/IP communication between H/Wblocks 100-1 to 100-n including the TCP/IP kernel 120 and other H/W blocks 100-1 to 100-n. An explanation follows with reference to the TCP/IP kernel 120-1 of the H/W block 1, for example.

The TCP/IP kernel 120-1 of the H/W block 1 can transmit a message to the S/W blocks 111-1 to 111-k and the TCP/IP kernel 120-2 to 120-n of the H/W blocks of the other party through the input/output unit 1000. Of course, more particularly, the TCP/IP kernel 120-1 is connected to the S/W blocks 111-1 to 111-k or the TCP/IP kernel 120-2 to 120-n of the other party through other intermediate processes shown in FIGS. 5 and 6, but not directly. However, an explanation of the intermediate process has been omitted for the sake of brevity.

The storage unit 1020 stores established values to provide the TCP session connectivity check in accordance with the present invention with respect to information on the S/W blocks 111-1 to 111-k currently operating on it and the operating S/W blocks 111-1 to 111-k. The established values that are stored in the storage unit 1020 and used to perform the TCP session connectivity check are described later.

The control unit 1010 determines a transmission condition of the SCC message and determines whether or not there is an abnormal operation of the TCP connection for the TCP session connectivity check of the present invention in accordance with the established values. The timer 1030 counts elapsed time for determining a period for transmitting the SCC message and the time interval when the SCC response message has not been received.

Figure 11:
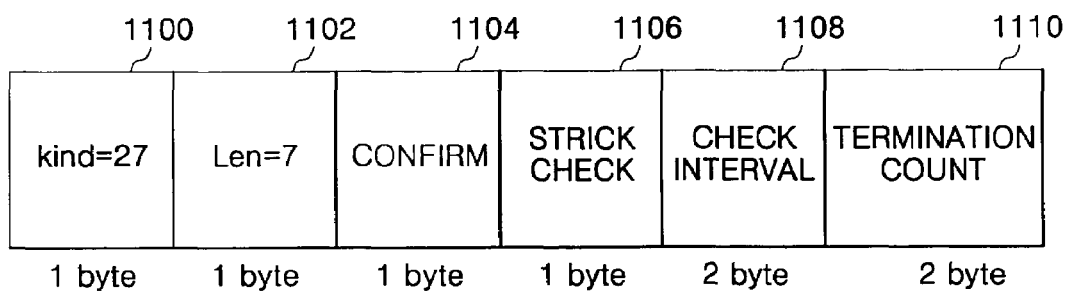
FIG. 11 is a view of a TCP session connectivity check option in accordance with an embodiment of the present invention.

FIG. 11 is a view of a TCP session connectivity check option in accordance with an embodiment of the present invention.

As shown in FIG. 11, the TCP session connectivity check option in accordance with an embodiment of the present invention includes a kind field 1100, a Len field 1102, a confirm field 1104, a strict check field 1106, a check interval field 1108, and a termination count field 1110.

In the embodiment shown in FIG. 11, the kind field 1100 set to kind=27 indicates that a TCP connection monitoring function in accordance with an embodiment of the present invention is established. The Len field set to length=7 indicates its length. The confirm field 1104 is a value indicating that the corresponding option is properly established. The strict check field 1106 determines whether the SCC message is always to be transmitted. The check interval field 1108 establishes a period with which the SCC message is transmitted. The termination count field 1110 can indicate the number of the SCC message to be re-transmitted or the time to wait for the SCC response message before the corresponding TCP session is closed when the SCC message or the SCC response message is not received.

An example of a program code with respect to an added socket option shown in FIG. 11 is as follows.

```
struct tcp_scc {
    intl_onoff;/ * zero = off, nonzero = on */
    intl_strict;/ * zero = non strict, nonzero = strict * /
    intl_interval;/ * seconds * /
    intl_count;
};
```

In the embodiment using this program code, at least established values, such as ON/OFF, strict, interval, and count for the TCP session connectivity check are used. The ON/OFF is a value indicating whether the TCP session connectivity check function in accordance with the present invention is used, which corresponds to a value of the confirm field 1104 shown in FIG. 11. The strict is a value indicating whether a message is periodically transmitted, which corresponds to a value of the strict check field 1106. The interval is a value indicating a time interval with which a message is transmitted, which corresponds to a value of the check interval field 1108. The count corresponds to a value of the termination count field 1110.

The ON/OFF value can be selected between "0" and "1". When the TCP session connectivity check function in accordance with the present invention is not used, the ON/OFF value is 0, and when the TCP session connectivity check function is used, the ON/OFF value is 1. The strict value can be either "0" or "1". When the strict value is 0, the TCP/IP kernel 120 periodically transmits the SCC message and performs the TCP session connectivity check. When the strict value is 1, the TCP/IP kernel 120 transmits the SCC message and performs the TCP session connectivity check when there is no signal on a TCP connection line that is monitored. The interval value is a time interval to transmit the SCC message and is generally set in seconds. The count value can be set to a value indicating the number of waiting intervals or a value indicating a waiting time.

Figure 12:
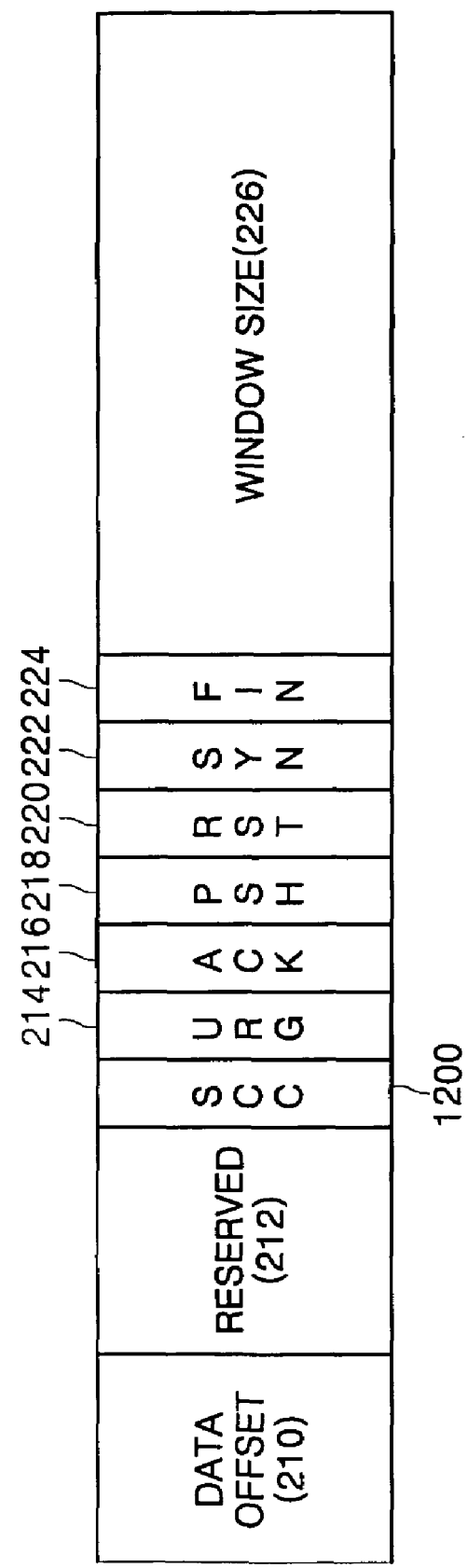
FIG. 12 is a view of a TCP packet format having a TCP session connectivity check function in accordance with an embodiment of the present invention.

These set values can be properly determined in each of the S/W blocks 111 to 119, and the TCP/IP kernel 120 performs the TCP session connectivity check function according to these set values. FIG. 11 shows the case that the kind field 1100 is set to 27, and the Len field 1102 is set to 7 in accordance an embodiment of the present invention. However, the set value of the field value shown in FIG. 11 and the set value of the size of each field are examples to make the present invention understood easily, and the present invention is not limited to the values. FIG. 12 is a view of a TCP packet format having a session connectivity check function in accordance with an embodiment of the present invention.

Referring to FIG. 12, the TCP packet having a connectivity check function can be created by using one bit of 6 bits of the reserved field 210 in the header unit of the TCP packet shown in FIG. 2 as the TCP session connectivity check (SCC) flag 1200 in accordance with an embodiment of the present invention. That is, the header unit of the TCP packet in accordance with an embodiment of the present invention has a control flag of 7 bits. The SCC field 1200 added to the existing control flags 214 to 224 is used for the connectivity check in accordance with an embodiment of the present invention.

After performing negotiation for monitoring the TCP connection established between two S/W blocks 111 to 119 using the TCP session connectivity check option when creating the TCP connection for the first time, the client side of the TCP connection transmits, to the server side of the TCP connection, the SCC message being the TCP packet having the TCP header that includes the SCC flag 1200 shown in FIG. 12. The client can be the TCP/IP kernel 120 existing under the S/W blocks 111 and 110 requesting the establishment of the TCP connection, and the server can be the TCP/IP kernel 120 existing under the S/W blocks 111 to 119 that are requested the establishment of the TCP connection from the client.

Figure 13:
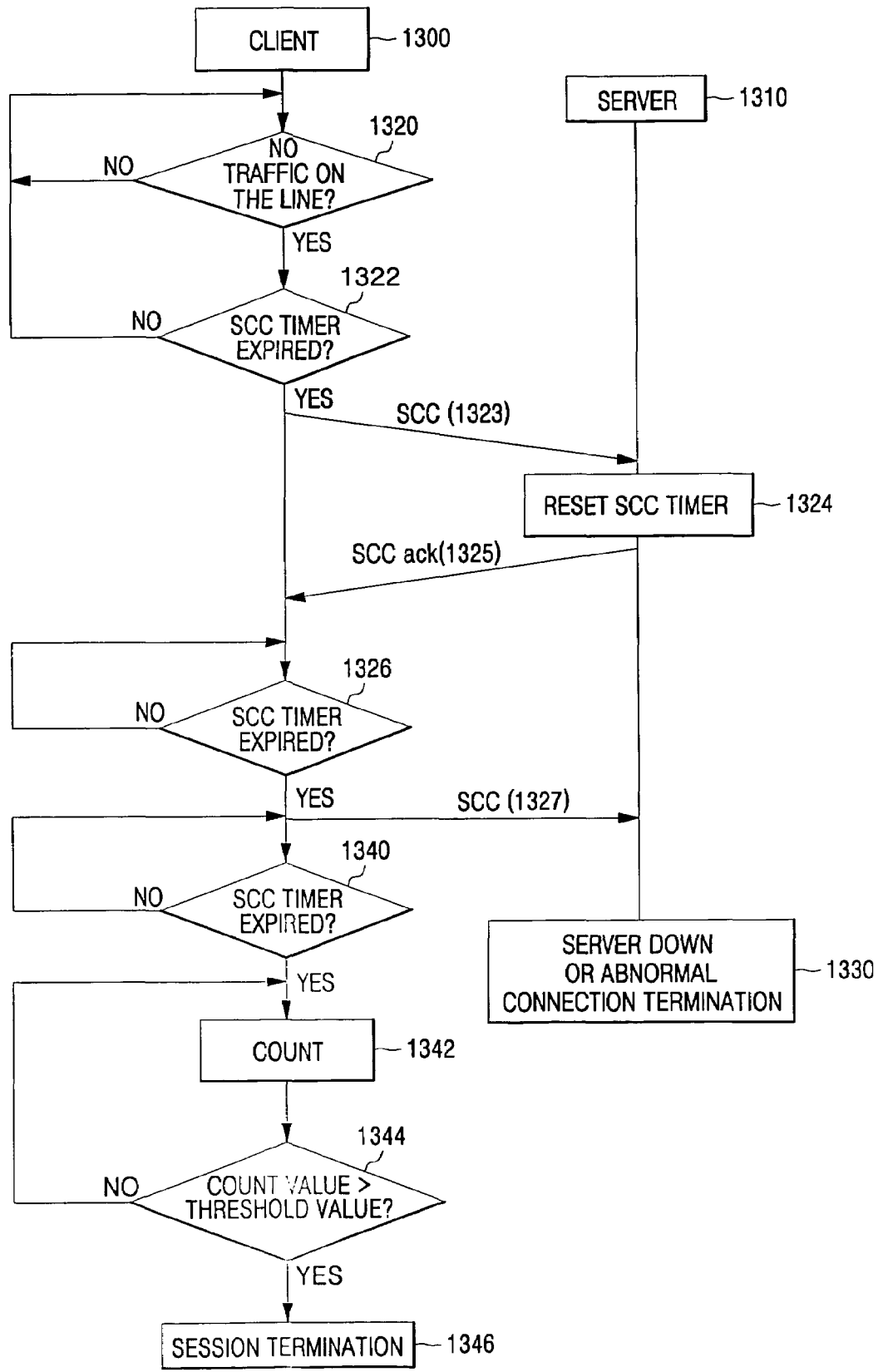
FIG. 13 is a flowchart of a TCP session connectivity check process in a client side in accordance with an embodiment of the present invention.
Figure 14:
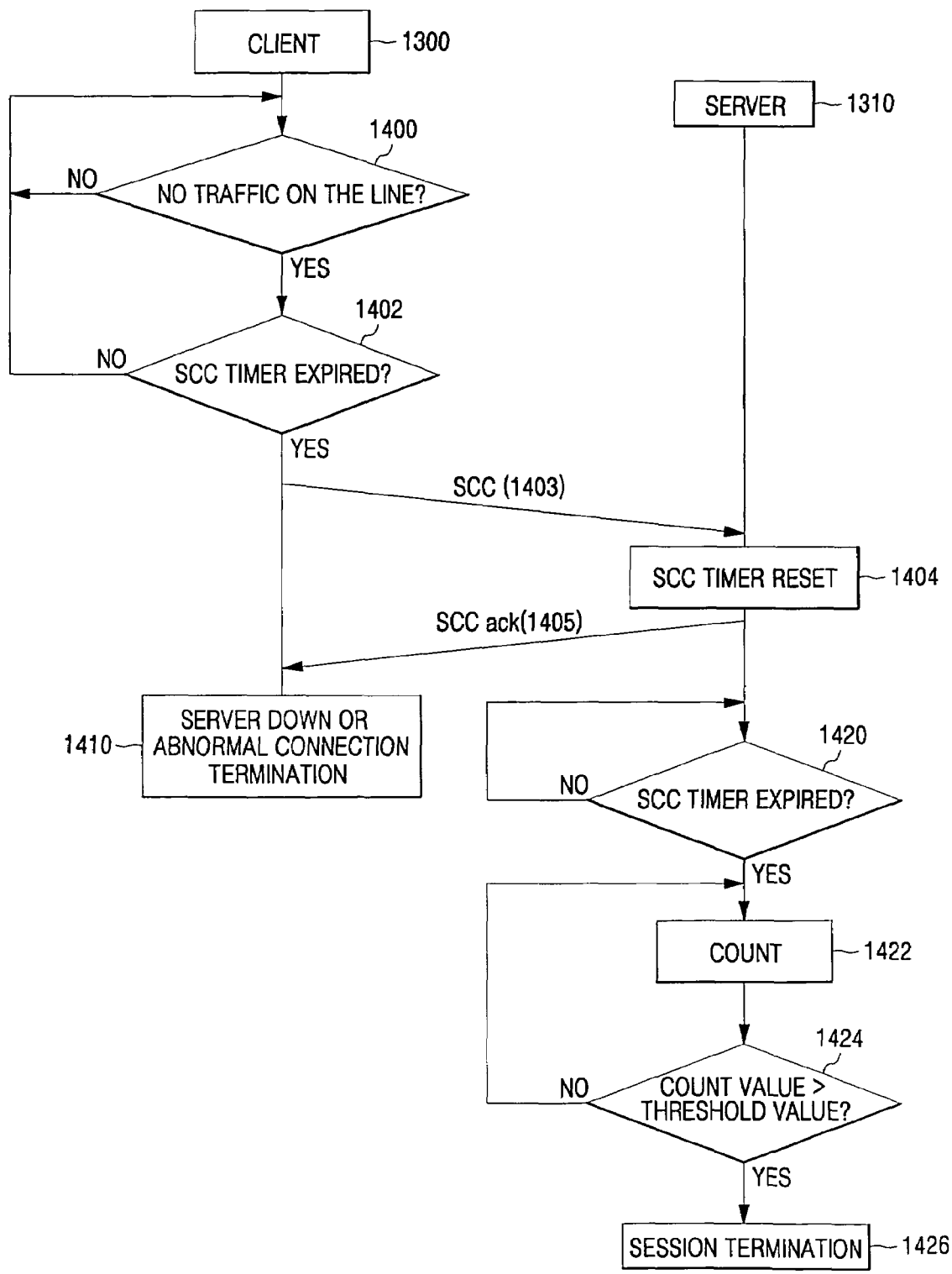
FIG. 14 is a flowchart of a TCP session connectivity check process in a server side in accordance with an embodiment of the present invention.

The TCP session connectivity check process in accordance with an embodiment of the present invention is explained below with reference to the embodiments of FIGS. 13 and 14. In FIGS. 13 and 14, the strict is set to "1". Accordingly, the TCP/IP kernel 120 does not always transmit the SCC message, and starts the TCP session connectivity check process only when the corresponding TCP connection receives no traffic.

FIG. 13 is a flowchart of a TCP session connectivity check process in a client side in accordance with an embodiment of the present invention.

The process of FIG. 13 is performed when an error occurs in a server 1310. The TCP session connectivity check process of FIG. 13 can be simply divided into 3 processes as follows.

(1) A client 1300 transmits the SCC message to a server 1310 according to a period established in the TCP session connectivity option in the SYNC when the TCP connection is created.

(2) When the client receives an SCC response message after transmitting the SCC message, it operates an SCC timer 1030 to transmit the next SCC message after an established time.

(3) When the client 1300 does not receive the SCC response message after transmitting the SCC message, it retransmits as many SCC messages as a set count. When the SCC response message is not received within the set count, the client 1300 closes the corresponding TCP connection.

The client 1300 determines whether there is traffic on a line connected to the server 1310 in step 1320 of FIG. 13. That is, the client 1300 determines whether there is a signal transmitted or received through the line. When there is no traffic on the line, the client 1300 starts to count using the SCC timer 1030.

The client 1300 determines in step 1322 whether the SCC timer 1030 is expired, that is, whether the time having no traffic between the server and the client exceeds a desired set time. When there is no traffic on the line between the client 1300 and the server 1310 for the set time, the client 1300 determines that there is a need for monitoring to determine if the TCP connection between the client 1300 and the server 1310 is operating normally. The client 1300 transmits an SCC message 1323 to the server 1310 in order to monitor the TCP connection with the server 1310.

The server 1310 receiving the SCC message 1323 from the client 1300 resets the SCC timer 1030 in step 1324. This is because that the server 1310 determines that there is traffic on a line connected to the client 1300 by receiving the SCC message 1323. The server 1310 informs the client 1300 that the TCP connection is normally performed, by transmitting the SCC message 1325 that is a response signal to the SCC message 1323 to the client 1300.

The client 1300 that received the SCC response message 1325 from the server 1310 resets the SCC timer 1030 and starts to count it again. The client 1300 transmits the SCC message to the server 1310 whenever the SCC timer 1030 has expired, and confirms that the TCP connection operates normally by receiving the SCC response message for the transmitted message.

On the contrary, when a message is not normally transmitted between two S/W blocks 111 to 119 due to an error in the TCP connection, although the client 1300 transmits the SCC message, the server 1310 cannot respond to that. Processes according to the above considerations are shown in steps 1326 to 1346.

The client 1300 determines whether the SCC timer 1030 has expired in step 1326. When the timer 1030 has expired, the client 1300 transmits the SCC message 1327 to the server 1310 again. Then, when the TCP connection with the server 1310 has expired abnormally, the SCC message 1327 cannot be transmitted to the server 1310, and the server cannot respond to that, either. Therefore, the client 1300 cannot receive a response message to the SCC message 1327 from the server 1310.

The client 1300 determines whether the SCC timer 1030 that started to count from the time when the SCC message 1327 was transmitted has expired in step 1340. When the SCC timer 1030 has expired, that is, when the client 1300 transmitted the SCC message 1327 to the server 1310 and it was determined that the time interval when a response message to the transmitted message was not received exceeded a set time, the client 1300 starts a count in order to determine whether the TCP connection with the server 1310 has expired abnormally in step 1342. When it is determined that the count value exceeded a desired threshold value in step 1344, the client 1300 determines that the TCP connection with the server 1310 was abnormally terminated, and terminates the corresponding TCP connection in step 1346.

Then, unlike the case shown in FIG. 13, a case can occur where an error occurs not in the server 1310 but in the client 1300 so that the TCP connection operates abnormally. In such a case, the server 1310 has to determine whether the TCP connection operates normally.

FIG. 14 is a flowchart of a TCP session connectivity check process in the server side in accordance with an embodiment of the present invention.

The embodiment shown in FIG. 14 is an embodiment that is performed when an error occurs in the client 1300. The TCP session connectivity check process shown in FIG. 14 can be simply divided into 3 processes as follows.

(1) The server 1310 waits for the SCC message to be received from the client 1300 according to a set period in the TCP session connectivity option included in an SYNC that is used when the TCP connection is created for the first time.

(2) When the SCC message is received from the client 1300 before the SCC timer 1030 has expired, the server 1310 transmits an SCC response message to the client 1300, and operates the SCC timer 1030 in order to determine whether the SCC message has been received within a set time.

(3) When the SCC timer 1030 has expired, the server 1310 operates the SCC timer 1030 to determine whether the SCC message has been received within a set count value. The server 1310 closes the corresponding TCP connection when the SCC message is not received within the set count value.

The client 1300 determines whether there is traffic on a line connected to the server 1310 in step 1400 of FIG. 14. When there is no traffic on the line, the client 1300 starts to count using the SCC timer 1030.

The client 1300 determines in step 1402 whether the SCC timer has expired, that is, whether a time interval having no traffic between the client and the server 1310 exceeded the set time. When there was no traffic on the line between the client 1300 and the server 1310 for the set time, the client 1300 determines that it is needed to check whether the TCP connection with the server 1310 operates normally. The client 1300 transmits the SCC message 1403 to the server 1310 in order to check the TCP connection with the server 1310.

The server 1310 that received the SCC message 1323 from the client 1300 resets the SCC timer 1030 in step 1404. This is because that the server 1310 determines that there is traffic on a line connected to the client 1300, by receiving the SCC message 1403. The server 1310 informs the client 1300 that the TCP connection is performing normally by transmitting the SCC response message 1405 that is a response signal to the SCC message 1404.

Then, since an error occurs in the client 1300 after transmitting the SCC message 1403, the client 1300 can be downed or the TCP connection can be terminated abnormally. In order that an embedded system operates effectively, the server 1310 must determine whether such a client 1300 is normal.

When an error occurs in the client 1300, the server 1310 cannot receive the SCC message from the client 1300. Accordingly, there is no signal on the TCP line until the SCC timer 1030 reset in step 1404 is expired. When the SCC timer 1030 has expired in step 1420, the server 1310 starts to count in order to determine whether the TCP connection with the client 1300 has terminated abnormally in step 1422. When it is determined that a count value exceeds a desired threshold value in step 1424, the server 1310 determines that the TCP connection with the client 1300 was terminated abnormally, and terminates the corresponding TCP connection in step 1426.

FIGS. 13 and 14 are flowcharts for the TCP session connectivity check process where the SCC message is transmitted and then the state of the corresponding TCP connection is monitored when a value of a strict check field 1106 is set to "1", that is, when the TCP/IP kernel 120 has no signal on an arbitrary TCP connection line. On the contrary, when the value of the strict check filed 1106 is set to "0", that is, when the TCP/IP kernel 120 periodically transmits the SCC message according to the set time interval and monitors the state of the TCP connection, the client 1300 omits a process to determine whether there exists traffic on a line and performs the TCP session connectivity check by transmitting the SCC message periodically in step 1320 of FIG. 13 and step 1400 of FIG. 14.

When the two embodiments having different transmission conditions of the SCC message according to the establishment of the strict value are considered in their effects, there can be differences like this. The first embodiment where the SCC message is transmitted only when the traffic does not exist on the TCP connection performs the TCP session connectivity check while creating less overhead compared with the second embodiment. However, if an error occurred in an arbitrary TCP connection, when traffic according to an abnormal operation exists on its line, it cannot be determined whether an error of the corresponding TCP connection occurs with the first embodiment. Therefore, it is desirable to determine the kind of the embodiment and to select a proper set value according to a characteristic of the system to which the TCP session connectivity check in accordance with the present invention is applied.

On the other hand, as described above, as for checking the state of the TCP connection established between the S/W blocks 111 to 119, although it is desirable that the client 1300 requesting the establishment of the TCP connection is the subject of the TCP connection state check, the server 1310 can be the subject of the TCP connection state check in accordance with the present invention by way of precaution against an error occurring in the client 1300. That is, the TCP connection state check in accordance with the present invention can be performed by allowing the server 1310 to determine the transmission condition of the SCC message and by transmitting the SCC message to the client 1300 when the condition is satisfied.

In an embedded system in accordance with the present invention, a function to monitor a TCP connection state can be standardized by embodying a function to monitor the state of a TCP connection at a system kernel level. Also, a development period of the system can be reduced and its reliability can be enhanced by embodying a function that can be embodied in a plurality of application S/W blocks in a system kernel, and then by providing an option to use the corresponding function.

What is claimed is:

1. An apparatus to manage a Transmission Control Protocol (TCP) connection established between two applications, comprising:
   a TCP/IP (Internet Protocol) kernel to:
      store establishment information of the TCP connection and an established value for a TCP session connectivity check with respect to the TCP connection;
      create a Session Connectivity Check (SCC) message according to the establishment information and established value, wherein the established value for the TCP session connectivity check includes a strict value indicating a transmission condition of the SCC message;
      periodically transmit the SCC message to a TCP/IP kernel of another party when the strict value has been established and
         the TCP connection between the two applications is determined to be closed because the SCC response message has not been received from the TCP/IP kernel of the other party within a predetermined time interval, and
      determine whether or not the TCP connection is operating normally in dependence upon whether an SCC response message has been received from the TCP/IP kernel of the other party; and
      upon a determination that the strict value has not been established, enable the TCP/IP kernel to transmit the SCC message when a signal does not exist on the TCP connection between the two applications and
         the TCP connection between the two applications is determined to be closed because the SCC response message has not been received from the TCP/IP kernel of the other party within a predetermined time interval, and
      determine whether or not the TCP connection is operating normally according to whether an SCC response message has been received from the TCP/IP kernel of the other party.

2. The apparatus according to claim 1, wherein the TCP/IP kernel comprises:
   a storage unit to store the establishment information for the TCP connection between the two applications and the established value for the TCP session connectivity check with respect to the TCP connection;
   a control unit to:
      create the SCC message with reference to the establishment information and established value;
      determine whether it is time to transmit the SCC message and to output the created SCC message at a time requested to transmit the SCC message, and to determine whether the TCP connection is operating normally according to whether the SCC response message has been transmitted from the TCP/IP kernel of the another party;
   an input/output unit to receive the SCC message from the control unit and to output a message to the TCP/IP kernel of the another party; and
   a timer to determine when it is time to transmit the SCC message.

3. The apparatus according to claim 1, wherein an application existing on a higher layer of the TCP/IP kernel between the two applications that are connected by the TCP connection requests the TCP/IP kernel to create a TCP connection and to perform a TCP session connectivity check with respect to the created TCP connection.

4. The apparatus according to claim 3, wherein the TCP/IP kernel performs the TCP session connectivity check with respect to the TCP connection only when the TCP session connectivity check with respect to the TCP connection has been requested by the application.

5. The apparatus according to claim 1, wherein the SCC message and the SCC response message include an SCC control flag indicating that the SCC message and the SCC response message comprise packets to monitor a connection state of the TCP connection.

6. The apparatus according to claim 1, wherein the TCP/IP kernel transmitting the SCC message to the TCP/IP kernel of the another party determines that the TCP connection between the two applications is abnormal when the SCC response message is not received from the TCP/IP kernel of the another party for a predetermined time interval.

7. The apparatus according to claim 1, wherein the established value for the TCP session connectivity check includes a value indicating whether a TCP session connectivity check function is to be performed.

8. The apparatus according to claim 1, wherein the established value to monitor the TCP connection comprises a value to establish a time interval with which the SCC message is to be transmitted.

9. The apparatus according to claim 1. wherein the TCP/IP kernel closes the TCP connection when it has been determined that the TCP connection between the two applications is abnormal.

10. A method of managing a Transmission Control Protocol (TCP) connection established between two applications, the method comprising: determining whether the TCP connection requests a TCP session connectivity check; creating a Session Connectivity Check (SCC) message according to the establishment information and established value for the TCP session connectivity check, wherein the established value for the TCP session connectivity check includes a strict value indicating a transmission condition of the SCC message; making a determination of whether the strict value has been established, enabling the TCP/IP kernel to periodically transmit the created SCC message to a TCP/IP kernel of another party connected via the TCP connection when the strict value has been established; and determining whether a response message for the SCC message has been received from the TCP/IP kernel of the other party within a predetermined time interval, and then determining that the TCP connection is not operating normally when the response message is not received within the predetermined time interval; and upon a determination that the strict value has not been established, making a determination of whether traffic does not exist on a TCP connection line, enabling the TCP/IP kernel to transmit the message to a TCP/IP kernel of another party connected via the TCP connection when a signal does not exist on the TCP connection, and determining whether a response message for the SCC message has been received from the TCP/IP kernel of the other party within a predetermined time interval, and then determining that the TCP connection is not operating normally when the response message is not received within the predetermined time interval.

11. The method according to claim 10, further comprising closing the TCP connection upon a determination that the TCP connection is not operating normally.

12. A program storage device, readable by a machine, embodying a program of instructions executable by the machine to perform a method of managing a Transmission Control Protocol (TCP) connection established between two applications, the method comprising: determining whether the TCP connection requests a TCP session connectivity check; creating a Session Connectivity Check (SCC) message according to the establishment information and established value for the TCP session connectivity check, wherein the established value for the TCP session connectivity check includes a strict value indicating a transmission condition of the SCC message; making a determination of whether the strict value has been established, enabling the TCP/IP kernel to periodically transmit the created SCC message to a TCP/IP kernel of another party connected via the TCP connection when the strict value has been established; and determining whether a response message for the SCC message has been received from the TCP/IP kernel of the other party within a predetermined time interval, and then determining that the TCP connection is not operating normally when the response message is not received within the predetermined time interval; and upon a determination that the strict value has not been established, making a determination of whether traffic does not exist on a TCP connection line, enabling the TCP/IP kernel to transmit the message to a TCP/IP kernel of another party connected via the TCP connection when a signal does not exist on the TCP connection, and determining whether a response message for the SCC message has been received from the TCP/IP kernel of the other party within a predetermined time interval, and then determining that the TCP connection is not operating normally when the response message is not received within the predetermined time interval.

13. The program storage device according to claim 12, the method further comprising closing the TCP connection upon a determination that the TCP connection is not operating normally.

* * * * *